United States Patent
Schroeder et al.

(10) Patent No.: US 7,653,214 B2
(45) Date of Patent: Jan. 26, 2010

(54) ACCELEROMETER UTILIZING IMAGE-BASED MOVEMENT TRACKING

(75) Inventors: Dale Schroeder, Scotts Valley, CA (US); George M Clifford, Jr., Los Altos Hills, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 737 days.

(21) Appl. No.: 11/332,888

(22) Filed: Jan. 17, 2006

(65) Prior Publication Data
US 2007/0165907 A1 Jul. 19, 2007

(51) Int. Cl.
*G06K 9/00* (2006.01)
*G01P 15/00* (2006.01)
*G01P 18/08* (2006.01)

(52) U.S. Cl. .................. 382/103; 73/514.01; 73/514.02; 73/514.21; 73/514.26

(58) Field of Classification Search .................. 382/100, 382/103, 312–324, 275, 284; 250/221, 221.1, 250/234, 235, 208.1, 556–557, 202; 235/461–462.8, 235/449–450; 345/173–178, 629–641; 356/28; 348/584–601; 358/474; 73/514.01–514.26
See application file for complete search history.

(56) References Cited

U.S. PATENT DOCUMENTS

| | | | | |
|---|---|---|---|---|
| 3,789,674 A | * | 2/1974 | Anderson et al. | 73/514.26 |
| 5,437,186 A | * | 8/1995 | Tschulena | 73/514.26 |
| 5,875,257 A | * | 2/1999 | Marrin et al. | 382/107 |
| 6,131,068 A | * | 10/2000 | Kau | 701/220 |
| 6,195,475 B1 | * | 2/2001 | Beausoleil et al. | 382/312 |
| 6,568,268 B1 | * | 5/2003 | Bennett | 73/514.26 |
| 7,104,129 B2 | * | 9/2006 | Nasiri et al. | 73/514.29 |
| 7,264,554 B2 | * | 9/2007 | Bentley | 473/222 |
| 2005/0229705 A1 | | 10/2005 | Geen | |

OTHER PUBLICATIONS

Phone-Or Ltd., "An Optical Revolution for the Accelerometer," pp. 1-13, 2002.

\* cited by examiner

*Primary Examiner*—Samir A. Ahmed
*Assistant Examiner*—Mehdi Rashidian

(57) ABSTRACT

An accelerometer captures multiple frames of image information and uses the image information to generate acceleration data related to an object. In particular, multiple image frames are used to determine relative movement between a target and an image collection system. The relative movement between the target and the image collection system is tracked over time to generate acceleration data related to the object.

24 Claims, 14 Drawing Sheets

ACCELEROMETER UTILIZING IMAGE-BASED MOVEMENT TRACKING

BACKGROUND OF THE INVENTION

An accelerometer is a device that measures its own acceleration as opposed to a device that measures the acceleration of a remote device. Accelerometers are often used along with gyroscopes in inertial navigation and guidance systems. A common use of accelerometers is in airbag deployment systems for automobiles.

Accelerometers that utilize a wide range of technologies have been developed. However, many accelerometers rely on complex and costly optical or electrical sensing technologies.

SUMMARY OF THE INVENTION

An accelerometer captures multiple frames of image information and uses the image information to generate acceleration data related to an object. In particular, multiple image frames are used to determine relative movement between a target and an image collection system. The relative movement between the target and the image collection system is tracked over time to generate acceleration data related to the object.

In one aspect of the invention, the target and image collection system of an accelerometer are configured such that one of the two elements moves relative to the other in response to acceleration of the object. The target includes at least one feature, which when moved relative to the image collection system, produces image information that is distinguishable in at least one direction. Image information captured by the image collection system is used to determine relative movement between the target and the image collection system and the movement information is used to generate acceleration data related to the object. The accelerometer can be configured to generate linear and/or angular acceleration data by controlling the degrees of freedom of movement between the target and the image collection system.

Other aspects and advantages of the present invention will become apparent from the following detailed description, taken in conjunction with the accompanying drawings, illustrated by way of example of the principles of the invention.

BRIEF DESCRIPTION OF THE DRAWINGS

Throughout the description similar reference numbers may be used to identify similar elements.

DETAILED DESCRIPTION

An accelerometer captures multiple frames of image information and uses the image information to generate acceleration data related to an object. In particular, multiple image frames are used to determine relative movement between a target and an image collection system. The relative movement between the target and the image collection system is tracked over time to generate acceleration data related to the object.

Figure 1:
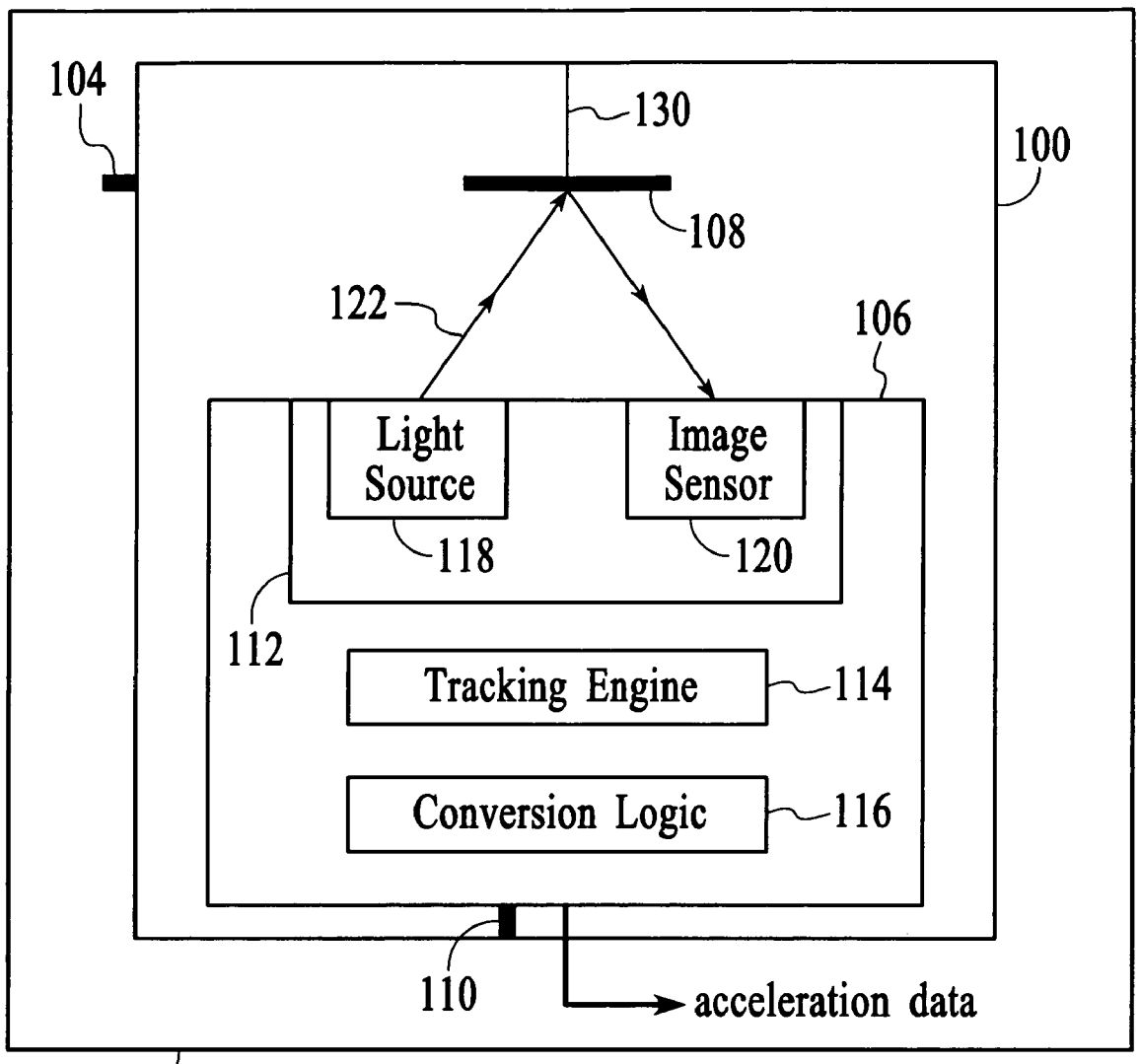
FIG. 1 depicts an accelerometer that is coupled to an object to generate acceleration data related to the object.

FIG. 1 depicts an accelerometer 100 that is coupled to an object 102 to generate acceleration data related to the object. The accelerometer is connected to the object by at least one rigid connection 104 that causes the accelerometer to move in unison with the object. The accelerometer includes a sensor module 106 and a target 108. The sensor module is connected within the accelerometer by at least one rigid connection 110 such that the sensor module and the object move in unison. The sensor module includes an image collection system 112, a tracking engine 114, and conversion logic 116. The image collection system includes a light source 118 and an image sensor 120. The light source provides a beam of light 122 that is directed to illuminate the surface of the target. In the embodiment of FIG. 1, the light source is a light emitting diode (LED) although other light sources are possible. The light source may be pulsed or emit a continuous beam of light depending on the application. The image sensor is an array of distinct photodetectors, for example, a 16×16 or 32×32 array of distinct photodetectors configured to detect light that is reflected from the target. Each of the photodetectors in the array generates light intensity information that is output as a digital value (e.g., an 8-bit digital value). Image information is captured in frames, where a frame of image information includes a set of simultaneously captured values for each distinct photodetector in the array.

The target 108 is connected within the accelerometer 100 by an inertial connection 130. The inertial connection is configured to allow movement between the object 102 and the image collection system 112 such that the target and the image collection system are able to move relative to each other in response to acceleration of the object. In general, it is not critical how the image collection system and the target are connected to the object as long as the image collection system and target are able to move relative to each other in response to acceleration of the object.

Figure 2:
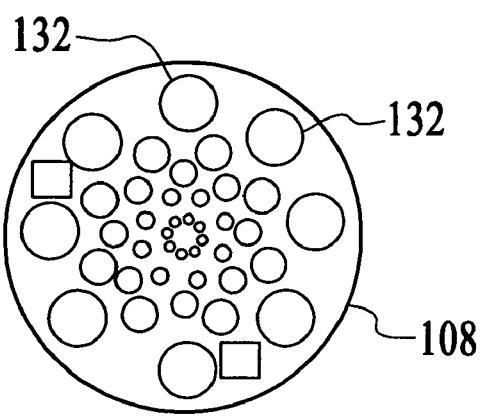
FIG. 2 depicts an example of a target with features that produce images which are distinguishable in at least one direction.
Figure 3:
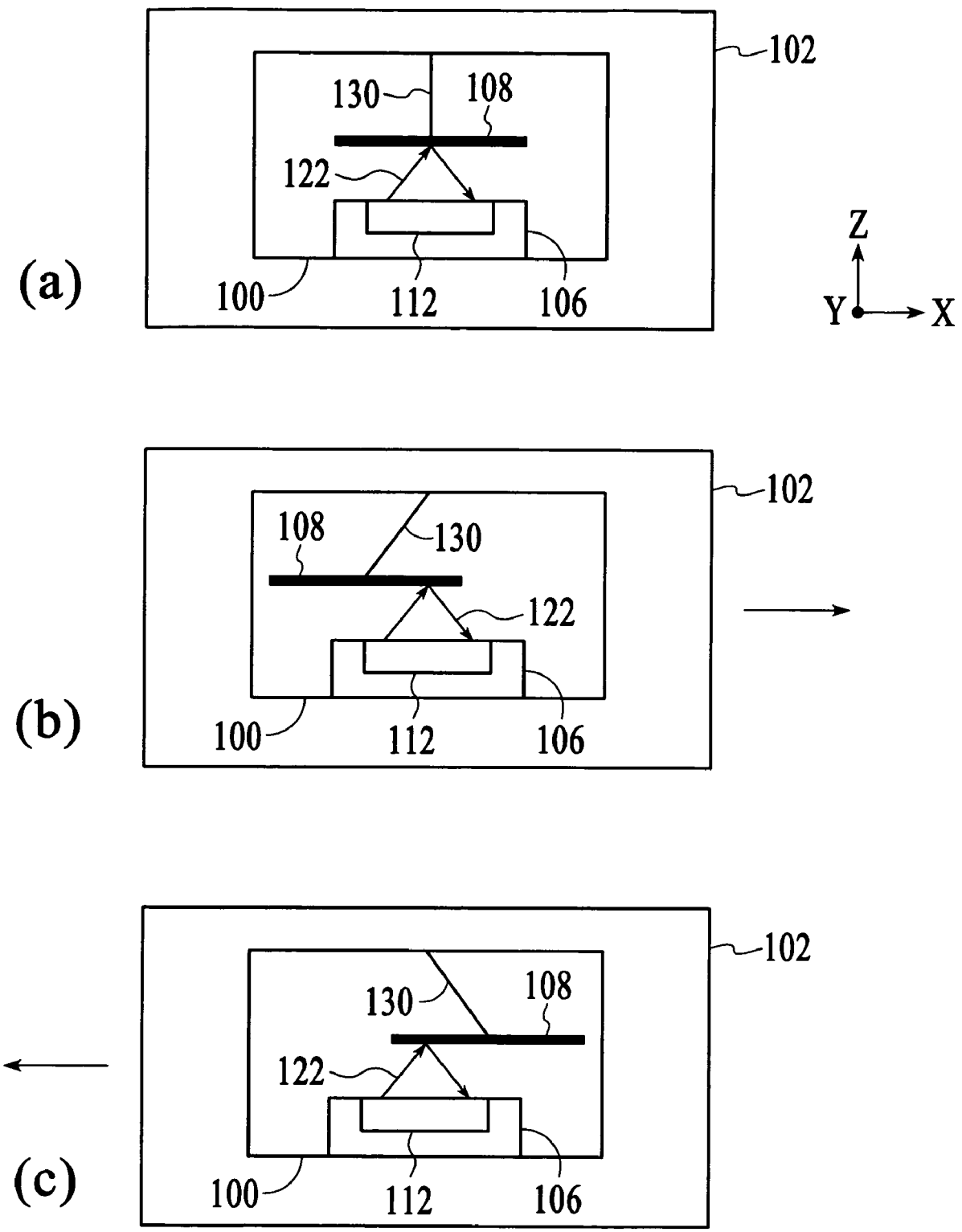
FIGS. 3(a)-3(c) depict the position of the target relative to the image collection system in response to acceleration in the x-direction.
Figure 4:
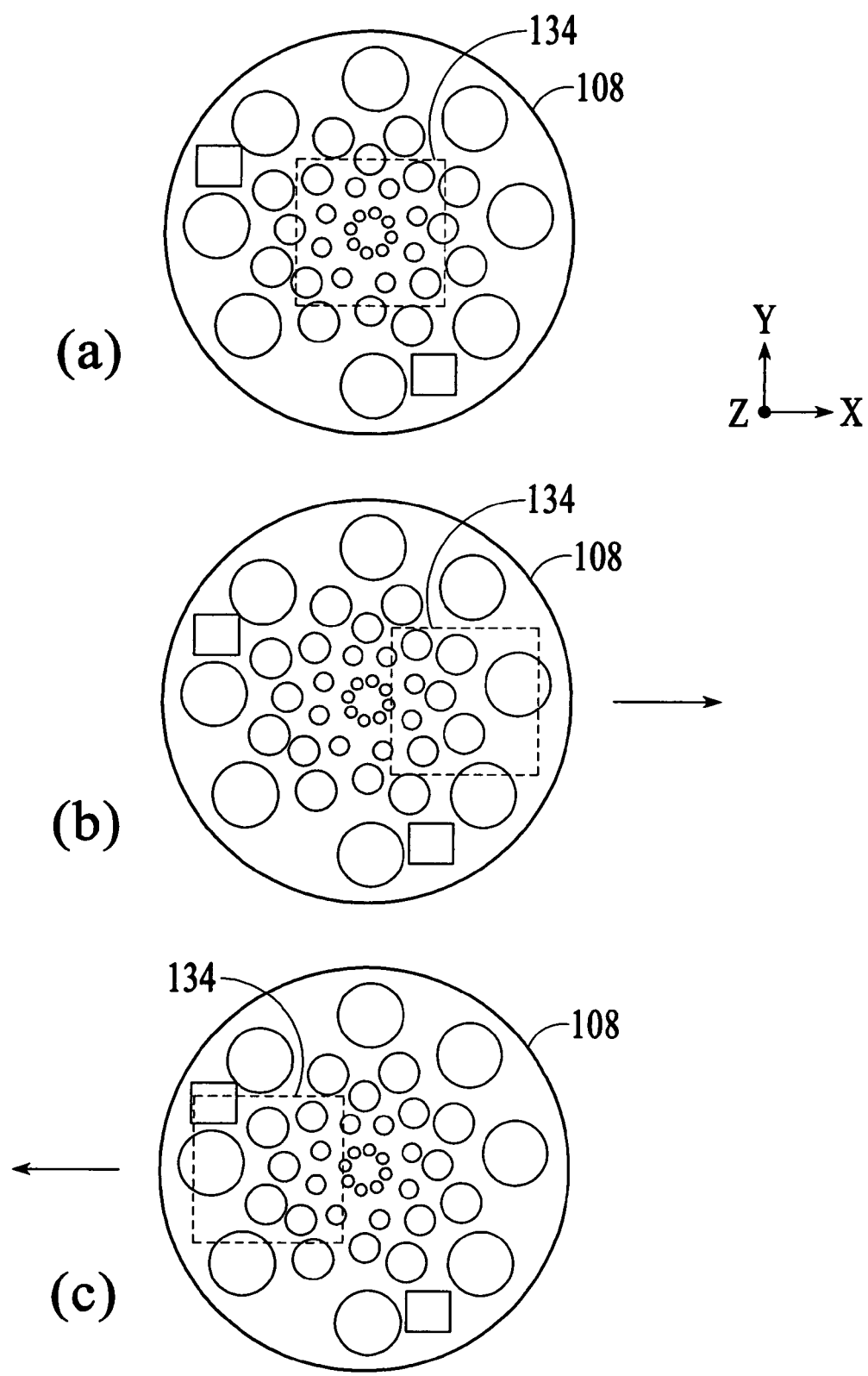
FIGS. 4(a)-4(c) depicts bottom views of the target relative to the image area that correspond to the positions in FIGS. 3(a)-3(c), respectively.
Figure 5:
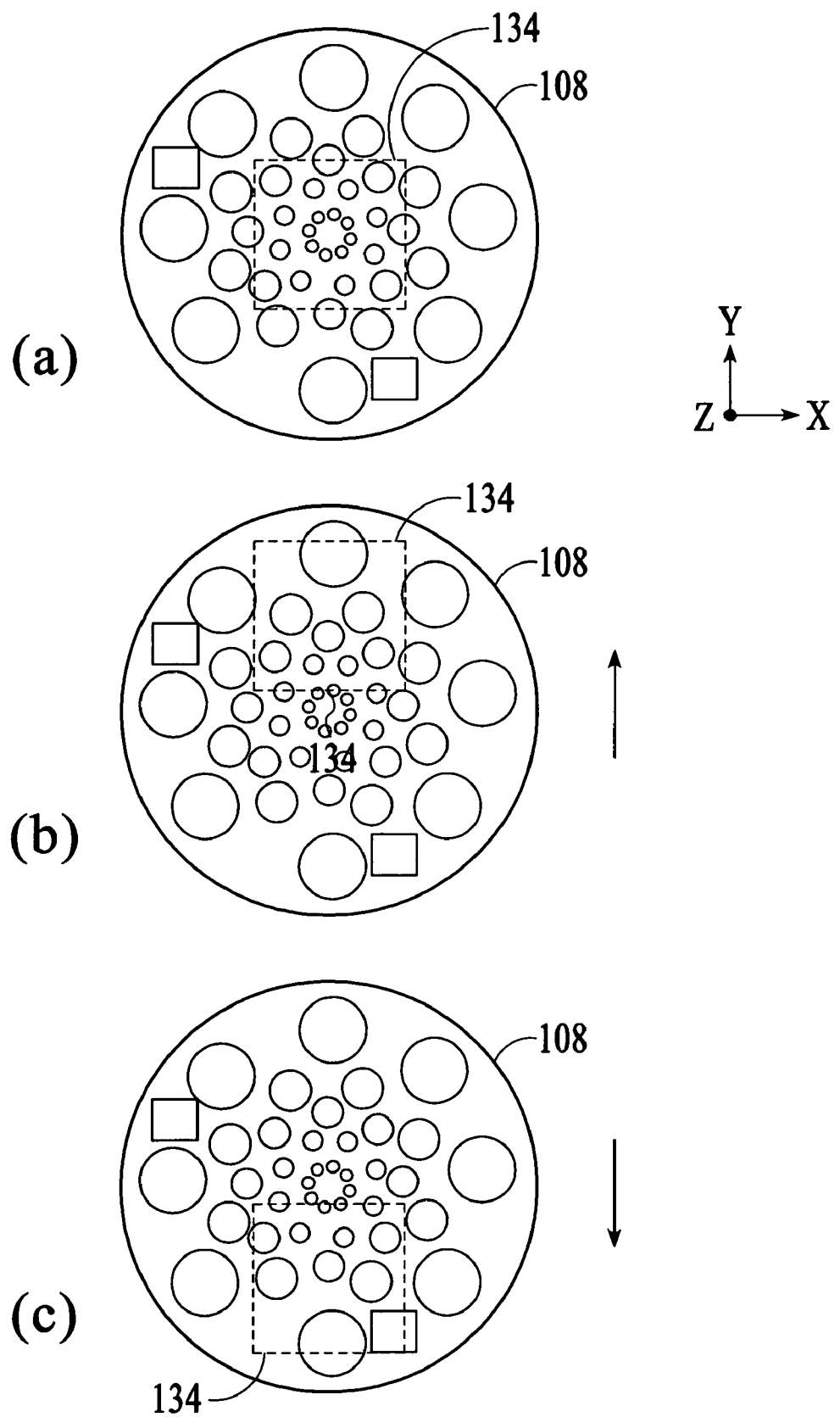
FIGS. 5(a)-5(c) depict bottom views of the target relative to the image area relative to acceleration in the y-direction.
Figure 6:
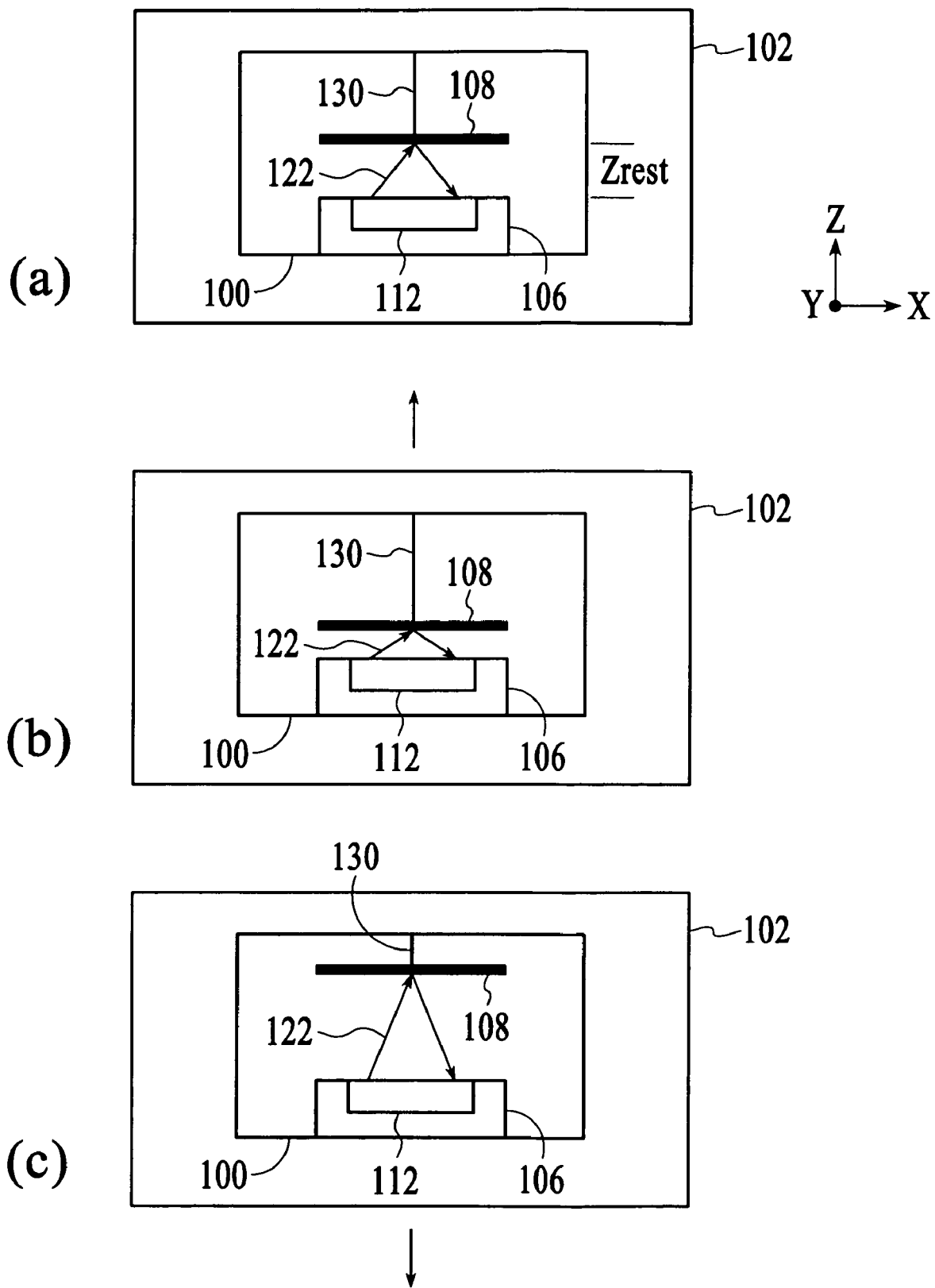
FIGS. 6(a)-6(c) depict the positions of the target relative to the image collection system in response to acceleration in the z-direction.
Figure 7:
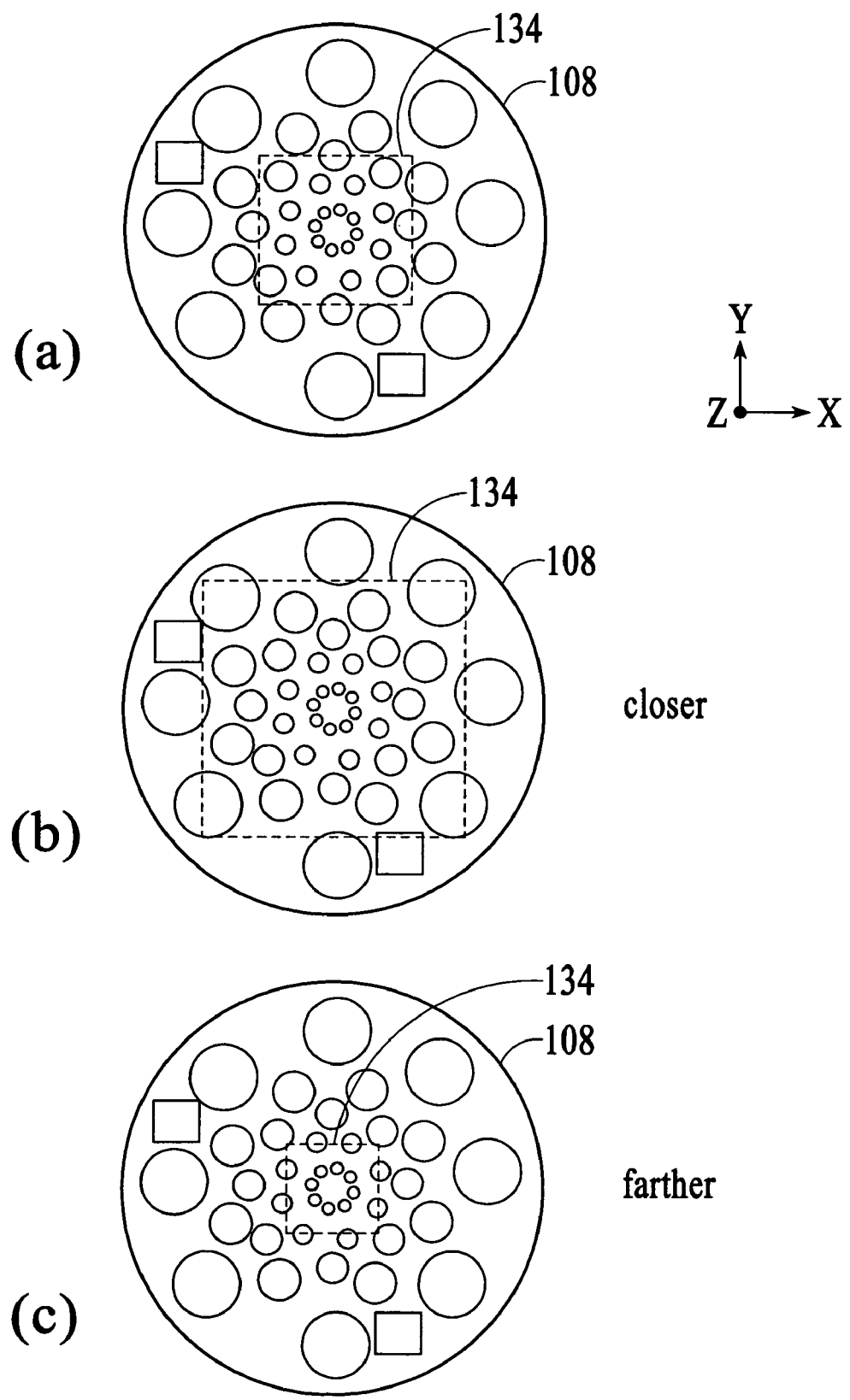
FIGS. 7(a)-7(c) depict bottom views of the target relative to the image area that correspond to the positions in FIGS. 6(a)-6(c), respectively.
Figure 8:
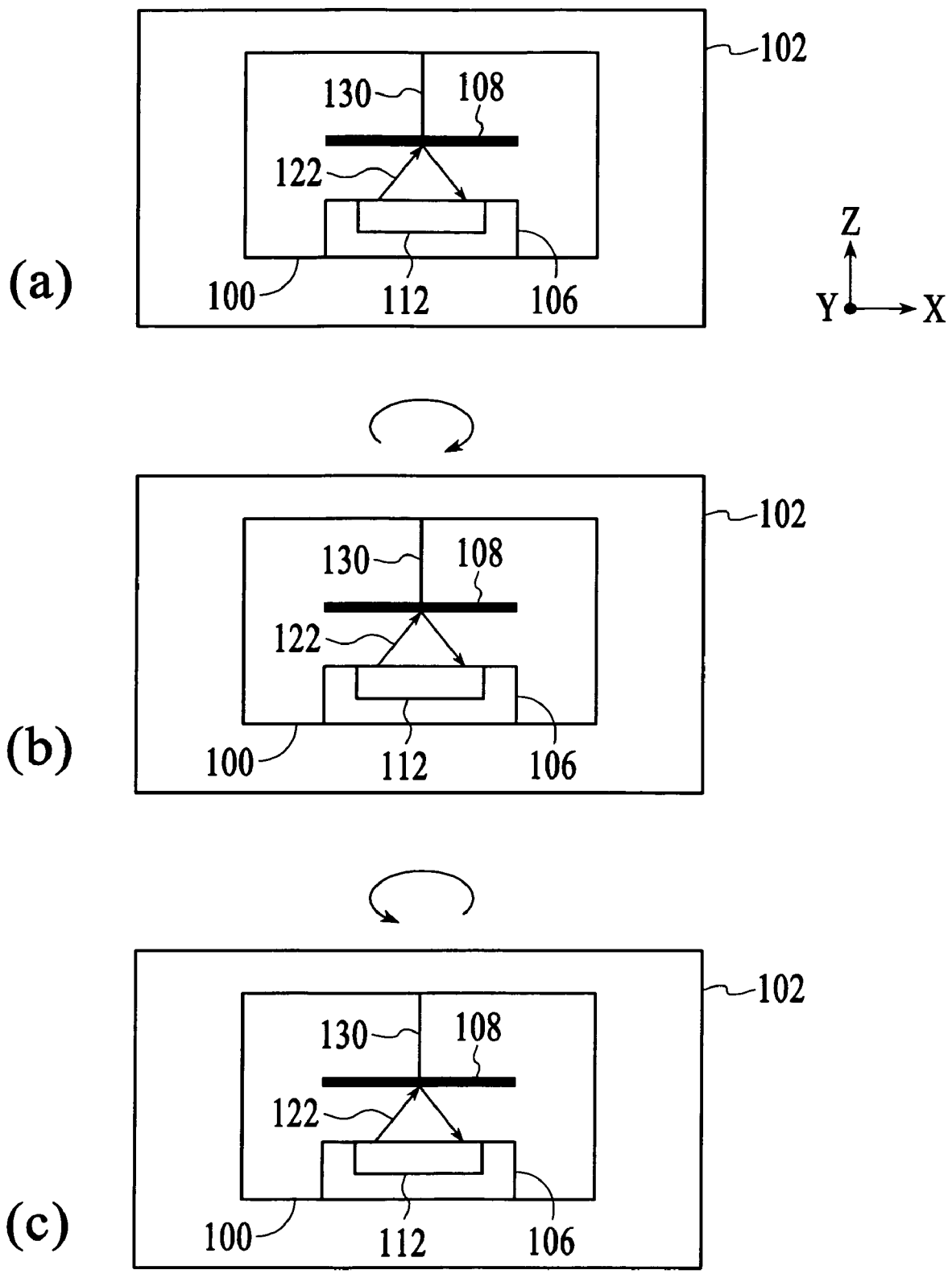
FIGS. 8(a)-8(c) depict angular acceleration states of the target relative to the image collection system about the z-axis.

The target 108 includes a feature or features, which when moved relative to the image collection system 112, produce an image that is distinguishable in at least one direction. That is, the feature or features are positionally unique in at least one direction. FIG. 2 depicts an example of a target 108 with features 132 that produce images which are distinguishable in at least one direction.

The accelerometer 100 described with reference to FIG. 1 can be used to generate acceleration data related to acceleration of the object 102 in the x-direction, the y-direction, and/or the z-direction. The accelerometer can also be used to generate acceleration data related to rotational acceleration about the z-axis. The accelerometer determines acceleration of the object by obtaining successive frames of image information and correlating the frames of image information to determine relative movement between the target 108 and the image collection system 112. Movement information is then converted to acceleration data by factoring in the time over which the movement takes place. The frames of image information must be obtained fast enough to capture the relative movement that occurs between the target and the image collection system in response to acceleration of the object. In an embodiment, image frames are captured at a rate of at least 1,000 frames per second. If the accelerometer is to be used in a real-time application, the correlation of the image frames and the calculation of acceleration data must be done fast enough to provide timely information.

In the accelerometer 100 of FIG. 1, the correlation of image frames is carried out by the tracking engine 114. In an embodiment in accordance with the invention, the tracking engine determines relative movement between the image collection system 112 and the target 108 by correlating common features that exist in successive image frames. The movement between image frames can be expressed in terms of movement vectors in, for example, the x-and y-directions (e.g., $\Delta x$ and $\Delta y$). More detailed descriptions of exemplary image-based movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are assigned to the assignee of the current invention and incorporated by reference herein.

The movement information generated by the tracking engine 114 is provided to the conversion logic 116. The conversion logic uses the movement information to generate acceleration data related to the object 102. For example, the conversion logic tracks the relative movement over time to obtain acceleration data. Instantaneous acceleration calculations can be made, for example, at a rate of at least 1,000 calculations per second.

Although the tracking engine 114 and conversion logic 116 are depicted in FIG. 1 as being incorporated within the sensor module 106, other configurations of the tracking engine, conversion logic, and image collection system 112 are possible. For example, the image collection system can be in a different device or some combination of the elements can be physically integrated into a single device.

Operation of the accelerometer 100 is now described with reference to FIGS. 3-9. In particular, the generation of acceleration data related to acceleration of the object 102 in the x-and y-directions is described with reference to FIGS. 3-5, the generation of acceleration data related to acceleration of the object in the z-direction is described with reference to FIGS. 6 and 7, and the generation of acceleration data related to rotational acceleration of the object is described with reference to FIGS. 8 and 9.

With respect to acceleration in the x-direction, FIG. 3(a) depicts the position of the target 108 relative to the image collection system 112 of the sensor module 106 when the object is not accelerating in the x-direction. As depicted in FIG. 3(a), the target and the image collection system are centrally aligned when there is no acceleration. The connections between the accelerometer 100 and the object 102 and between the sensor module 106 and the accelerometer are not depicted in the forgoing figures to minimize clutter in the figures.

Because of the inertial connection between the target 108 and the object 102, acceleration of the object in the x-direction causes the image collection system 112 to move relative to the target. For example, FIG. 3(b) depicts the case in which the object is accelerated in the positive x-direction. In this case, the inertial connection 130 between the target and the object allows movement of the target, which in turn allows the image collection system to move in the positive x-direction relative to the target. FIG. 3(c) depicts the case in which the object is accelerated in the negative x-direction. In this case, the inertial connection allows the image collection system to move in the negative x-direction relative to the target.

The image collection system 112 collects image frames from the target 108. The area of the target that is captured in each image frame is referred to herein as the "image area." The location of the image area relative to the target is a function of the position of the target relative to the image sensor (not shown) of the image collection system. FIG. 4(a) depicts a bottom view of the target 108 relative to the image area (identified by dashed box 134) when the object is not accelerating. In this case, the image sensor of the image collection system is aligned with the center of the target and therefore the image area is aligned with the center of the target. As described above, with reference to FIGS. 3(b) and 3(c), acceleration of the image collection system in the x-direction causes the image collection system to move relative to the target. The movement of the image collection system relative to the target translates into a shift in the location of the image area on the target. For example, acceleration of the object in the positive x-direction causes the image area to shift in the positive x-direction relative to the target. FIG. 4(b) depicts the image area relative to the target with the image area shifted in the positive x-direction. Likewise, acceleration of the object in the negative x-direction causes the image area to shift in the negative x-direction relative to the target. FIG. 4(c) depicts the image area relative to the target with the image area shifted in the negative x-direction. Assuming the target contains features that are directionally unique in the x-direction, the image frames that are captured by the image collection system change with the relative movement between the target and the image collection system. The changes in successive image frames are correlated to determine relative movement between the image collection system and the target. Movement information that results from the correlation is used to generate acceleration data related to acceleration of the object in the x-direction.

Acceleration of the object 102 in the y-direction can be determined if the inertial connection 130 between the target 108 and the object allows for relative movement in the y-direction and if the target contains a feature or features 132 that are directionally unique in the y-direction. Again, the location of the image area 134 relative to the target is a function of the position of the target relative to the image sensor of the image collection system. FIG. 5(a) depicts a bottom view of the target relative to the image area when the object is not accelerating in y-direction. In this case, the image sensor is aligned with the center of the target and therefore the image area is aligned with the center of the target. Acceleration of the object and the image collection system in the y-direction causes the image collection system to move relative to the target and the movement of the image collection system relative to the target translates into a shift in the location of the image area on the target. For example, acceleration of the object in the positive y-direction causes the image area to shift in the positive y-direction relative to the target. FIG. 5(b) depicts the image area relative to the target with the image area shifted in the positive y-direction. Likewise, acceleration of the object in the negative y-direction causes the image area to shift in the negative y-direction relative to the target. FIG. 5(c) depicts the image area relative to the target with the image area shifted in the negative y-direction. Assuming the target contains features that are directionally unique in the y-direction, the image frames that are captured by the image collection system change with the relative movement between the target and the image collection system. As in the x-direction, the changes in successive image frames are correlated to determine relative movement between the image collection system and the target. Movement information that results from the correlation is used to generate acceleration data related to acceleration of the object in the y-direction.

In addition to the x-and y-directions, acceleration data can be generated related to acceleration of the object 102 in the z-direction if the inertial connection 130 allows relative movement in the z-direction between the target 108 and the image collection system 112 and if the target contains a feature or features that are directionally unique in the z-direction. With respect to acceleration in the z-direction, FIG. 6(a) depicts the position of the target relative to the image collection system when the object is not accelerating in the z-direction. As depicted in FIG. 6(a), the target and the image collection system are separated in the z-direction by a distance $Z_{rest}$. Because of the inertial connection between the target and the object, acceleration of the object in the z-direction causes the image collection system to move relative to the target. For example, FIG. 6(b) depicts the case in which the object is accelerated in the positive z-direction. In this case, the inertial connection between the target and the object allows movement of the target, which in turn allows the image collection system to move closer to the target (e.g., $z<Z_{rest}$). FIG. 6(c) depicts the case in which the object is accelerated in the negative z-direction. In this case, the inertial connection allows the image collection system to move farther from the target (e.g., $z>Z_{rest}$).

In the z-direction, the size of the image area 134 relative to the target 108 is a function of the distance between the image collection system 112 and the target. In one embodiment, when the target and image collection system are relatively close to each other, more of the target falls within the image area and when the target and the image collection system are relatively far from each other, less of the target falls within the image area. FIG. 7(a) depicts a bottom view of the target relative to the image area when the object is not accelerating (e.g., at $z=Z_{rest}$). As described above, with reference to FIGS. 6(b) and 6(c), acceleration of the object 102 in the z-direction causes the image collection system to move relative to the target and the movement of the image collection system relative to the target translates into a change in the amount of the target that is included within the image area. Acceleration of the object in the positive z-direction results in more of the target falling within the image area and acceleration of the object in the negative z-direction results in less of the target falling within the image area. FIG. 7(b) depicts the image area relative to the target in the case where the target and image collection system are closer to each other than in the case of FIG. 7(a) and FIG. 7(c) depicts the image area relative to the target in the case where the target and the image collection system are farther from each other than in the case of FIG. 7(a). Assuming the target contains features that are directionally unique in the z-direction, the image frames that are captured by the image collection system change with the relative movement between the target and the image collection system. The changes in successive image frames are correlated to determine relative movement between the image collection system and the target. In the case of z-direction movement, the correlation of image frames may involve comparing the sizes of image features to a pre-established database to determine movement in the z-direction. Movement information that results from the correlation is then used to generate acceleration data related to acceleration of the object in the z-direction.

In addition to the linear x-, y-, and z-directions, acceleration data can be generated related to angular acceleration of the object 102 if the inertial connection 130 allows rotational movement between the target 108 and the image collection system 112 and if the target contains a feature or features 132 that are rotationally unique about the desired axis. For description purposes, angular acceleration is described with reference to angular acceleration about the z-axis although the technique can be applied to angular acceleration about the x-and/or y-axes.

With respect to angular acceleration about the z-axis, FIG. 8(a) depicts the target 108 relative to the image collection system 112 of the sensor module 106 when the object is not accelerating about the z-axis. Because of the inertial connection 130 between the target and the object, angular acceleration of the object about the z-axis causes the image collection system to move relative to the target. The two directions of acceleration of the object about the z-axis are indicated in FIGS. 8(b) and 8(c). In FIG. 8(b) the object is accelerating in the clockwise direction and in FIG. 8(c) the object is accelerating in the counter-clockwise direction.

The orientation of the image area 134 relative to the target 108 is a function of the rotational position of the image sensor relative to the target. FIG. 9(a) depicts a bottom view of the target relative to the image area when the object is not accelerating about the z-axis. As described above, acceleration of the object about the z-axis causes the image collection system to rotate relative to the target and the rotation of the image collection system relative to the target translates into a change in the orientation of the image area relative to the target.

Figure 9:
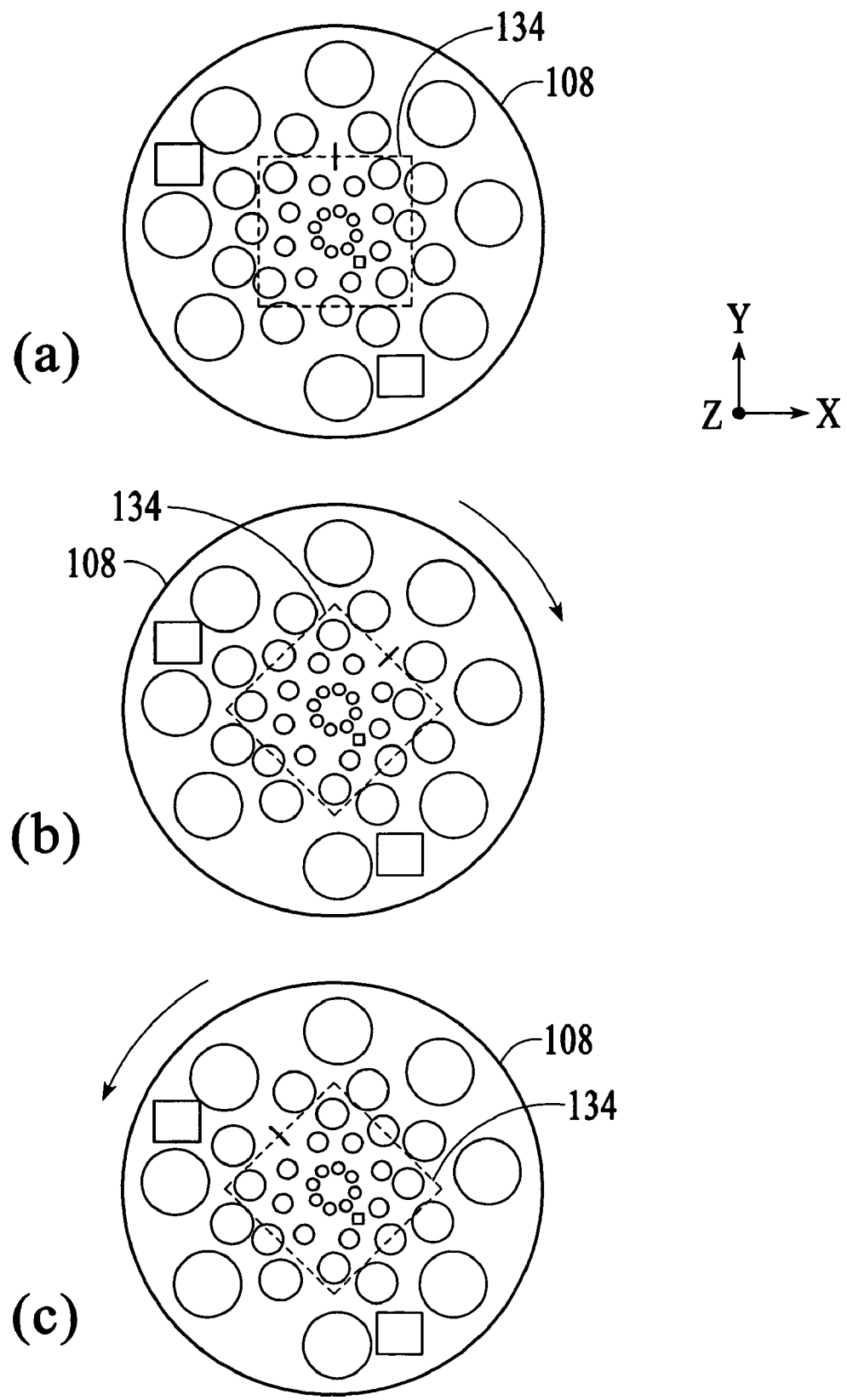
FIGS. 9(a)-9(c) depict bottom views of the target relative to the image area in response to the angular acceleration states from FIGS. 8(a)-8(c), respectively.

Angular acceleration of the object in the clockwise direction results in the image area rotating in the clockwise direction relative to the target and angular acceleration of the object in the counter-clockwise direction results in the image area rotating in the counter-clockwise direction relative to the target. FIG. 9(b) depicts the image area relative to the target with the image area rotated in the clockwise direction and FIG. 9(c) depicts the image area relative to the target with the image area rotated in the counter-clockwise direction. Assuming the target contains features that are rotationally unique about the z-axis, the image frames that are captured by the image collection system change with the rotational movement between the target and the image collection system. The changes in successive image frames are correlated to determine rotational movement between the image collection system and the target. Movement information that results from the correlation is used to generate acceleration data related to angular acceleration of the object about the z-axis. Although one technique for determining rotational movement is described with reference to FIGS. 8 and 9, other techniques for determining rotational movement are possible. For example, rotation outside of the z-axis can be determined by tracking the changes in feature shapes. For example, a square feature on a target may appear as a trapezoid feature in response to rotational movement between the image collection system and the target.

Figure 10:
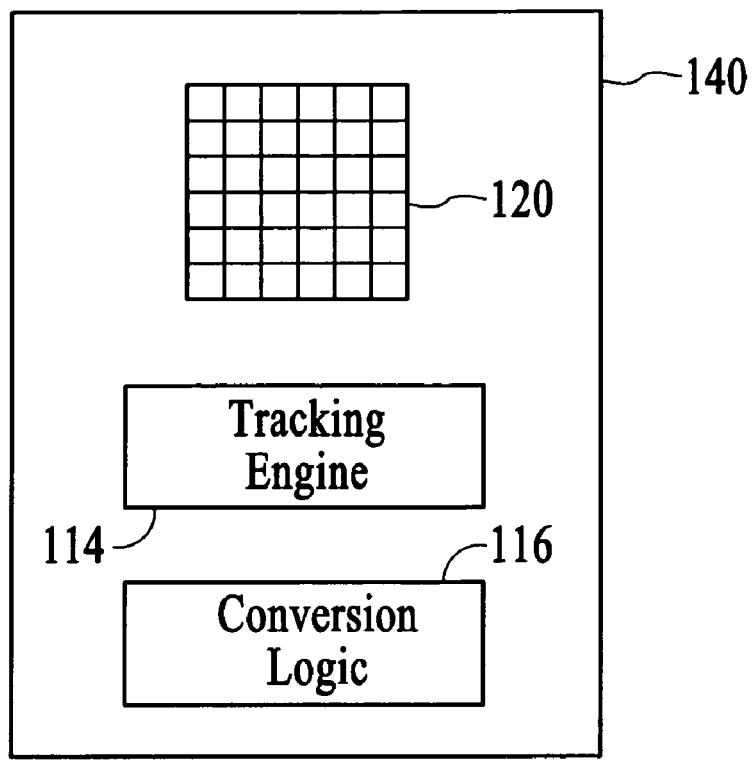
FIG. 10 depicts an example of an IC chip that includes the image sensor, the tracking engine, and the conversion logic from FIG. 1.

In an embodiment in accordance with the invention, some of the elements of the accelerometer are fabricated onto a single integrated circuit (IC) chip. FIG. 10 depicts an example of an IC chip 140 that includes the image sensor 120, the tracking engine 114, and the conversion logic 116 from FIG. 1. Other functionality can also be incorporated into the same IC chip.

Figure 11:
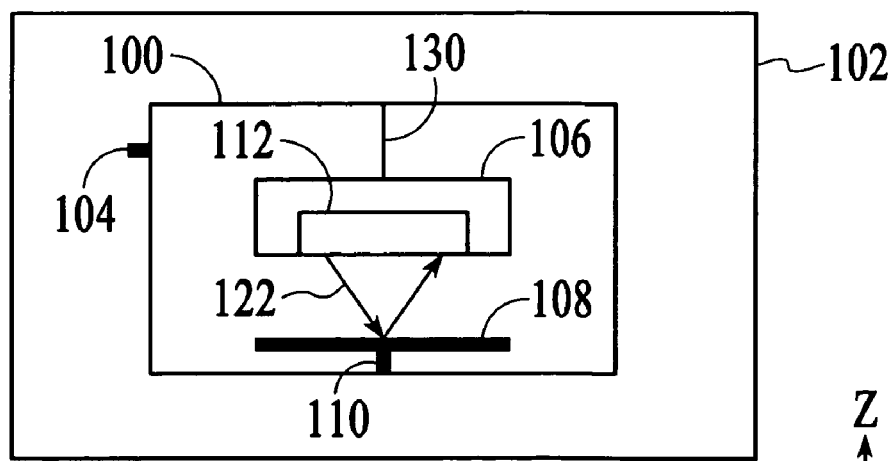
FIG. 11 depicts an accelerometer connected to an object in which the target is connected to the object by a rigid connection such that the target and the object move in unison while the image collection system is connected to the object by an inertial connection which allows movement between the image collection system and the object.

Although the accelerometer 100 described with reference to FIG. 1 has a rigid connection 104, 110 between the image collection system 112 and the object 102 and an inertial connection 130 between the target 108 and the object, other combinations of rigid and inertial connections which enable relative movement between the target and the image collection system are possible. For example, FIG. 11 depicts an accelerometer 100 connected to an object 102 in which the target 108 is connected to the object by rigid connections 104, 110 such that the target and the object move in unison while the image collection system 112 is connected to the object by an inertial connection which allows movement between the image collection system and the object. As stated above, it is not critical how the image collection system and the target are connected to the object as long as the image collection system and target are able to move relative to each other in response to acceleration of the object.

FIG. 1 depicts one example of an accelerometer 100 that utilizes the correlation of image frames to generate acceleration data. Other embodiments of such an accelerometer are described with reference to FIGS. 12-11. Each of these accelerometers includes a target 108 and an image collection system 112 that are able to move relative to each other in response to acceleration of an object 102. Additionally, the target has a feature or features, which when moved relative to the image collection system, produce an image that is distinguishable in at least one direction.

Figure 12:
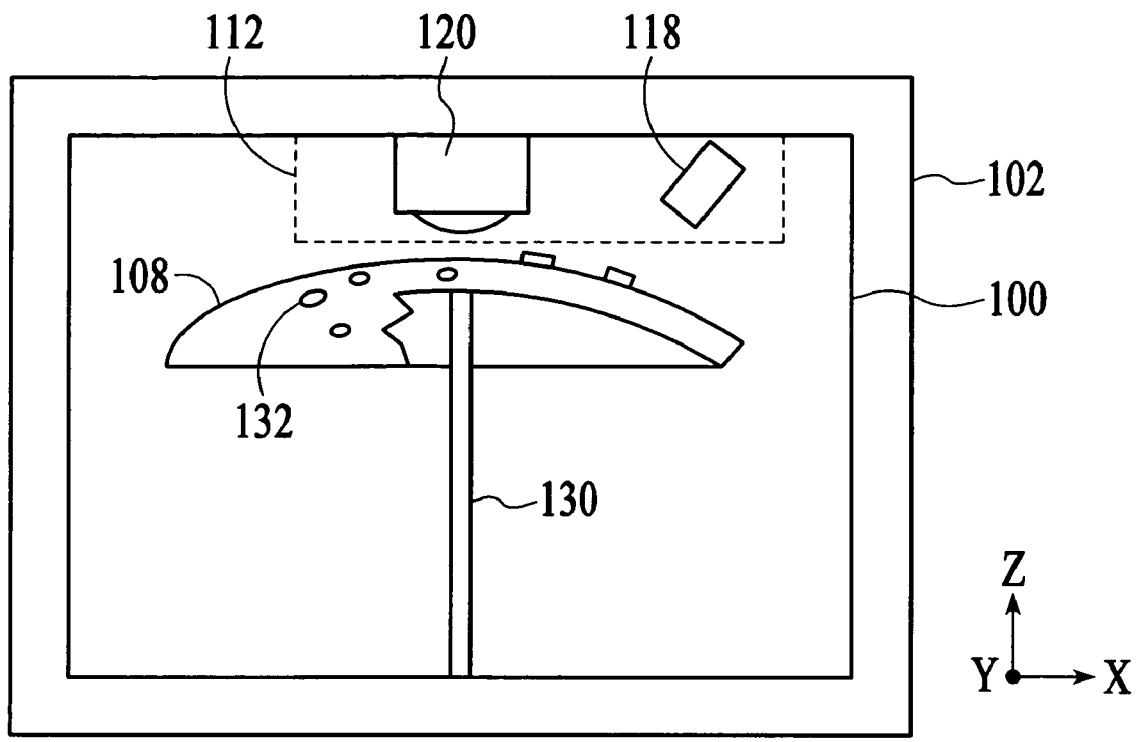
FIG. 12 depicts a portion of an accelerometer in which the target is a portion of a hemisphere with positionally-unique features on the top surface of the hemisphere.

FIG. 12 depicts a portion of an accelerometer 100 in which the target 108 is a portion of a hemisphere with positionally-unique features 132 on the top surface of the hemisphere. The target is connected to the object 102 by an inertial connection 130 and the image collection system 112 is connected to the object by a rigid connection (not shown). The target and image collection system are configured such that the top of the target is exposed to the image collection system. In the example of FIG. 12, the target is able to move in the x-and y-directions, thereby enabling the generation of acceleration data related to acceleration of the object in the x-and y-directions.

Figure 13:
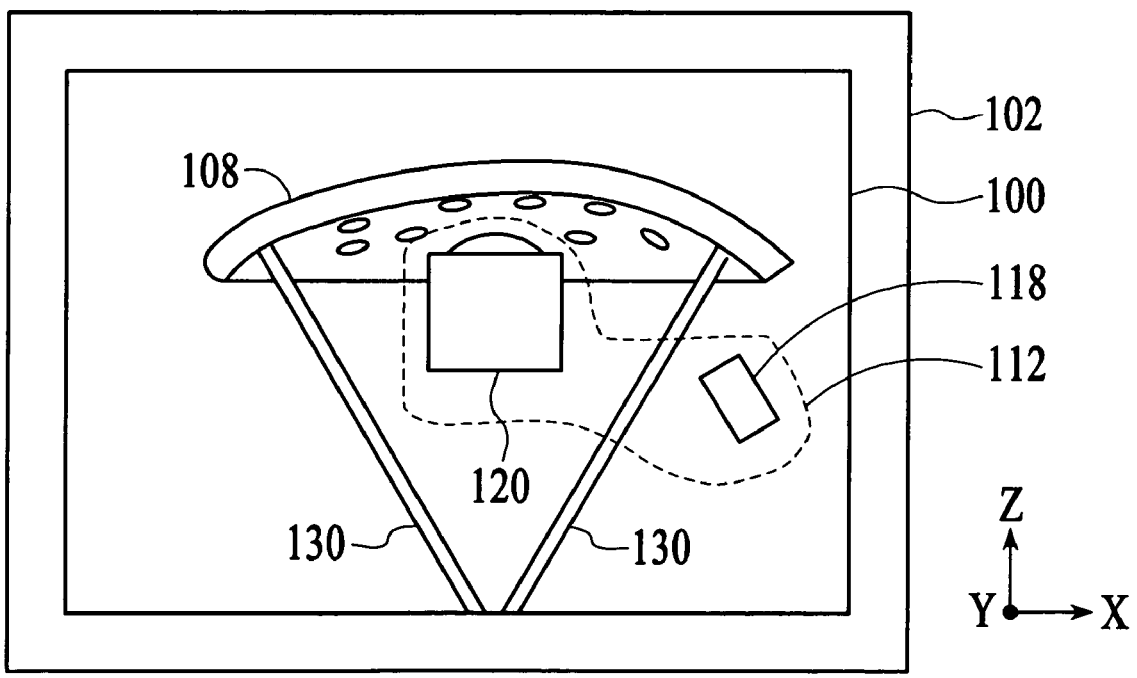
FIG. 13 depicts a portion of an accelerometer in which the target is a portion of a hemisphere with positionally-unique features on the bottom surface of the hemisphere.

FIG. 13 depicts a portion of an accelerometer 100 in which the target 108 is a portion of a hemisphere with positionally-unique features on the bottom surface of the hemisphere. The target is connected to the object 102 by an inertial connection 130 and the image collection system 112 is connected to the object by a rigid connection (not shown). The target and image collection system are configured such that the bottom surface of the target is exposed to the image collection system. In the example of FIG. 13, the target is able to move in the x-and y-directions, thereby enabling the generation of acceleration data related to acceleration in the x-and y-directions.

Figure 14:
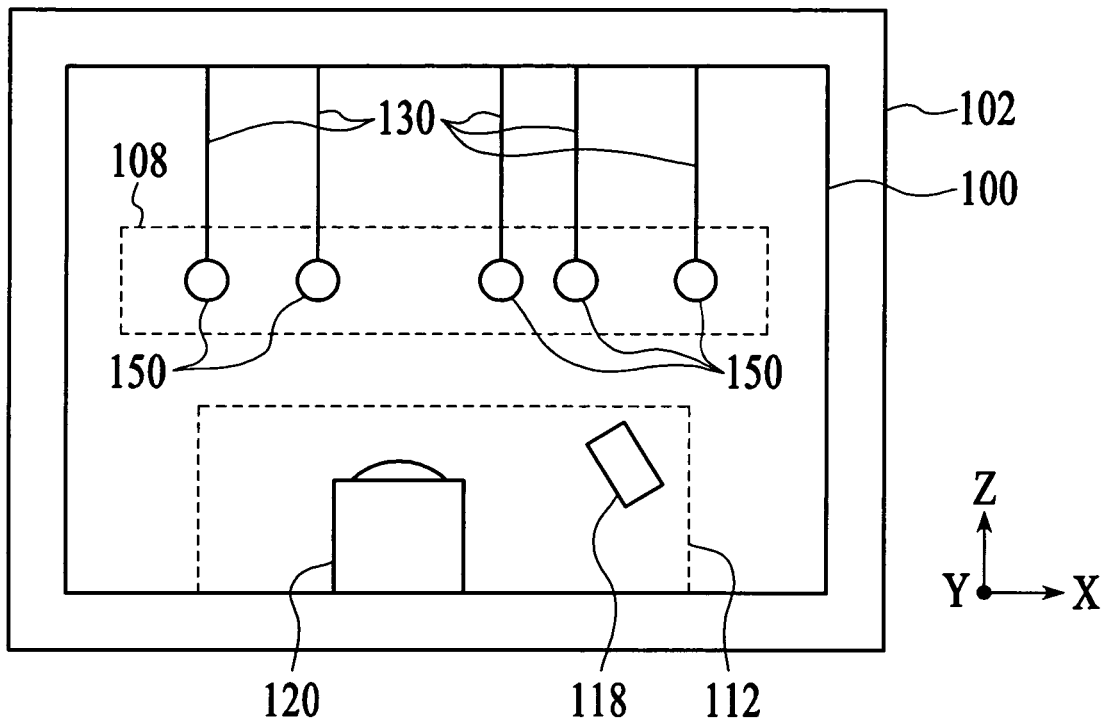
FIG. 14 depicts a portion of an accelerometer in which the target includes multiple balls that are each suspended by inertial connections in a pattern that is directionally unique in the x-and/or y-directions and rotationally unique about the z-axis.

FIG. 14 depicts a portion of an accelerometer 100 in which the target 108 includes multiple balls 150 that are each suspended by inertial connections 130 in a pattern that is directionally unique in the x-and/or y-directions and rotationally unique about the z-axis. The balls and image collection system 112 are configured such that balls fall within the image area of the image sensor 120. The inertial connections enable the balls to move relative to the image collection system in response to acceleration of the object 102. In the example of FIG. 14, the balls that make up the target are configured to move in the x-and y-directions, thereby enabling the generation of acceleration data related to acceleration of the object in the x- and y-directions as well as rotational acceleration about the z-axis. In an alternative embodiment, a single ball is enough to support the generation of acceleration data related to acceleration of the object in the x-and y-directions.

Figure 15:
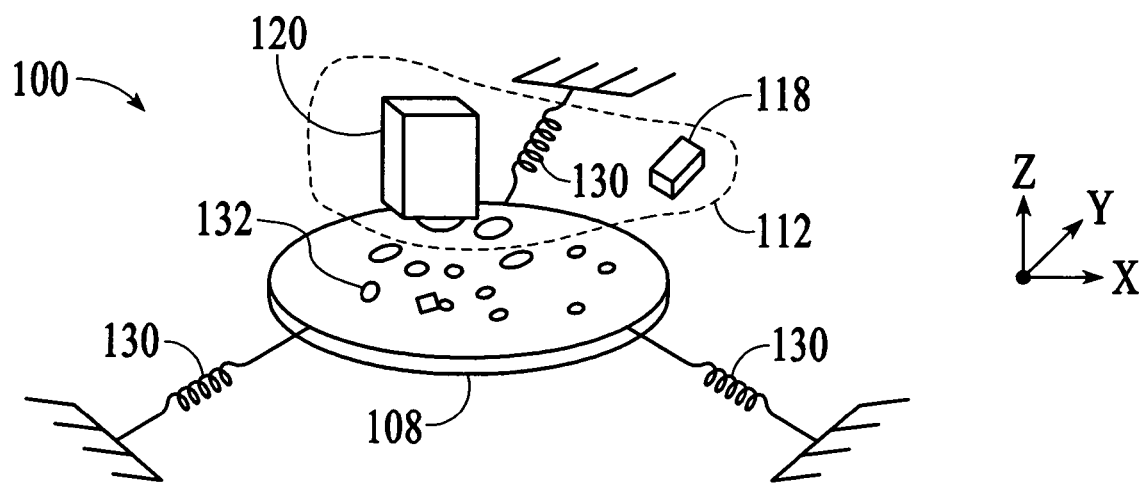
FIG. 15 depicts a portion of an accelerometer in which the target is a disk that includes positionally-unique features on the top surface of the disk that are captured by the image collection system.

FIG. 15 depicts a portion of an accelerometer 100 in which the target 108 is a disk that includes positionally-unique features 132 on the top surface of the disk that are captured by the image collection system 112. The disk is connected by an inertial connection 130 that includes three springs which suspend the target and enable the target to move in the x-and y-directions relative to the image collection system. Additionally, the target is able to rotate about the z-axis. Assuming the target includes features that are rotationally unique about the z-axis, this configuration can be used to generate linear acceleration data related to acceleration of the object in the x-and y-directions as well as angular acceleration data related to acceleration of the object about the z-axis. As an alternative to utilizing separate coil springs and a disk, these components could be fabricated together in a single process, for example by injection molding plastic, stamping, etching, MEMS, or cutting a stack of flat sheets by wire electro discharge machining (EDM). An exemplary arrangement constrains the disk from out-of-plane motion. For example, the disk is placed between two parallel surfaces in near contact. The volume containing the disk and springs can be filled with a fluid to provide lubrication and damping. An alternate configuration includes several springs spiraling in from the sides and could be fabricated from a single flat sheet of compliant material.

Figure 16:
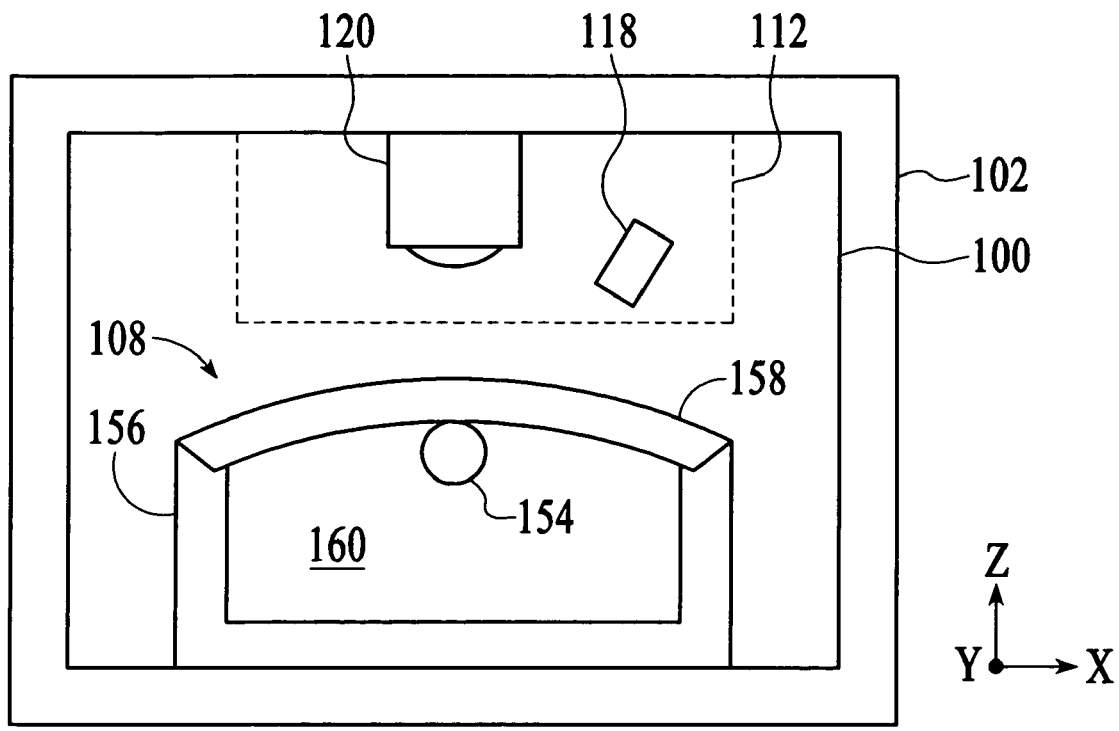
FIG. 16 depicts a portion of an accelerometer in which the target includes a bubble that is contained within an enclosure that is filled with a liquid and has a domed and transparent top.

FIG. 16 depicts a portion of an accelerometer 100 in which the target 108 includes a bubble 154 that is contained within an enclosure 156, 158 that is filled with a liquid 160 and has a domed and transparent top 158. The bubble is free to move within the enclosure but because of its buoyancy, it seeks the highest spot within the dome. Although the bubble seeks the highest spot within the dome, the bubble will be temporarily displaced from the highest spot within the dome in response to acceleration of the enclosure in the x-and/or y-directions. The bubble is imaged through the transparent top by the image collection system 112. Movement of the bubble in the x-and/or y-directions is converted into acceleration data as described above. Multiple bubbles could be used to detect angular acceleration over short time periods. The bubble could alternatively be a floating element, such as a floating sphere that is buoyant in the liquid within the enclosure.

Figure 17:
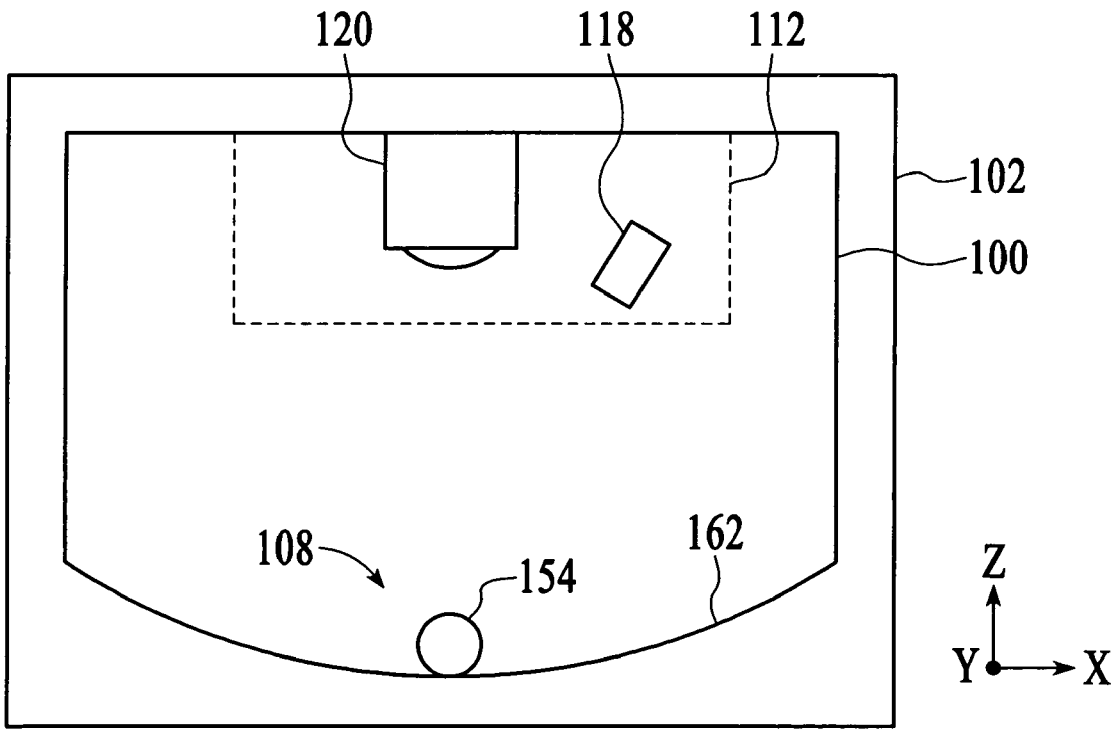
FIG. 17 depicts a portion of an accelerometer in which the target includes a ball that sits on a curved surface.

FIG. 17 depicts a portion of an accelerometer 100 in which the target 108 includes a ball 160 that sits on a curved surface 162. The curved surface is shaped such that the ball is able to move along the curved surface in response to acceleration of the object (not shown). When the object is not accelerating, the ball will tend to rest at the lowest point of the curved surface. Movement of the ball along the curved surface is captured in image frames by the image collection system 112 and used to generate movement information. The movement information is used to generate the acceleration data as described above. In the example of FIG. 17, the ball and curved surface are configured to allow the ball to move in the x-and y-directions, thereby enabling the generation of acceleration data related to acceleration of the object in the x-and y-directions. In the example of FIG. 17, the walls of the curved surface become steeper as the sphere is accelerated away from the center so that the distance the sphere travels from the center is a function of the acceleration of the object. The cross section of the curved surface could be circular, parabolic, or any other desired shape. Liquid can be added into the bowl formed by the curved surface for damping.

Figure 18:
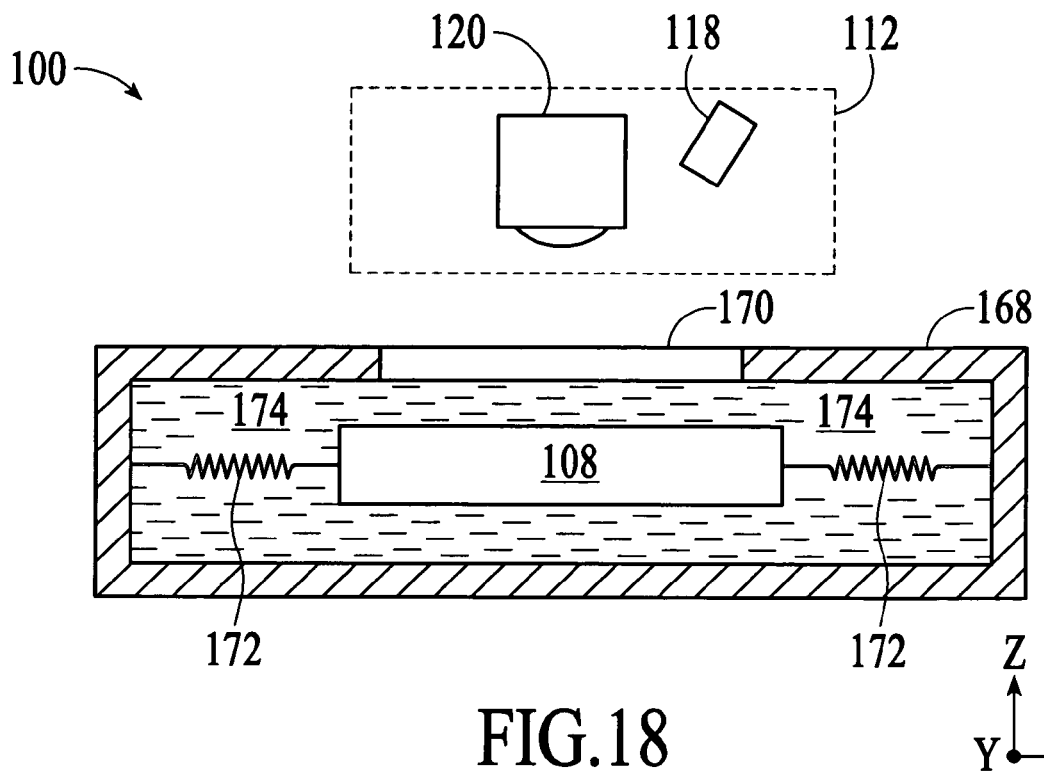
FIG. 18 depicts a portion of an accelerometer in which the target includes a disk that is set within an enclosure.

FIG. 18 depicts a portion of an accelerometer 100 in which the target 108 includes a disk that is set within an enclosure 168. The disk has positionally-unique features (not shown) on the top surface that can be imaged and the enclosure includes a transparent section 170 through which the disk can be imaged by the image collection system 112. The disk is supported within the enclosure by springs 172 and the enclosure is filled with a liquid 174. In an embodiment, the disk is neutrally buoyant and is able to move in the x- and y-directions and rotate about the z-axis. In an alternative embodiment, a neutrally buoyant sphere is suspended in a spherical liquid-filled enclosure. The sphere is patterned on its entire surface and a small portion of the surface is imaged by the image collection system. Magnets could be built into the sphere and surrounding structure to return the sphere to its neutral position. If the sphere floats freely without a mechanism to return the sphere to a neutral position, short duration angular acceleration can be measured.

Damping of the target can be provided by, for example, eddy current, viscous fluids, or air vanes. In addition to these techniques, damping can be realized using a polymer or elastomeric material as a coating over the inertial connection. Alternatively, the damping material could be included as a separate damping element of the inertial connection. In another embodiment, the entire inertial connection could be made of the elastomeric material. For example, an elastomeric post provides both the compliance and damping required to support the patterned target.

Damping material absorbs energy much like a resistor in an electrical circuit and can eliminate or lessen the oscillations after an acceleration event. In a spring-mass embodiment of an inertial connection, it may be desirable to tune the system so that it is "critically damped," that is, enough damping to just eliminate oscillation of the target due to acceleration of the object. In some cases, it might not be desirable or necessary to eliminate such oscillation. Because the image rate can be upwards of 2,000 frames per second, it may not be necessary or desirable to add damping if the resonant frequencies of the device are below 50% of the image frame rate.

An accelerometer oriented on the plane of rotation and located a known distance from the center of rotation can be used to compute angular acceleration of a body. Two sensors located a known distance apart can be used to compute the angular acceleration if the center is not known.

The bending movement on an inertial connection and target due to linear acceleration is a function of the inertial connection's bending stiffness and the mass of the target. The twisting movement on a target due to angular acceleration is a function of the inertial connection's rotational stiffness and the distribution of the mass in the target. The farther that the mass is located from the center of the target, the larger the twisting moment becomes. Both the rotational and bending stiffnesses of the inertial connection are a function of its cross section geometry, length, and material properties.

Using three posts as an inertial connection allows even more design flexibility for adding additional torsional and linear stiffness. Unlike a single post inertial connection, the patterned surface of the target can remain parallel under acceleration, although the distance from the image collection system would increase or decrease as it moves depending upon the location of the image collection system (e.g., above or below or the target).

In some cases it might be desirable to mount a target on a deformable post. That is, if a certain acceleration level is exceeded, the elastic limit of the post is exceeded, and the target does not return to its neutral position. This could be used for keeping a physical record of a catastrophic event.

A history of acceleration levels can be kept as a record in a memory device. This could be a record of the highest acceleration values and time that they occurred. A record could also be kept of accelerations leading up to a catastrophic acceleration event, such as a collision.

As used herein, the process of correlating image frames involves any operation of using successive image frames to determine movement. For example, the correlation of image frames may involve comparing two successive image frames to each other or comparing image frames to a pre-established database.

The sensor module may include optics to manipulate the transmitted optical beam that illuminates the target and to focus reflected light onto the image sensor. The optics are implementation specific and may be applied to the transmitted portion of the beam, the reflected portion of the beam, or the both portions of the beam. The optics may include a combination of optical devices including, for example, lenses and reflectors. In order for movement tracking to be effective, the reflected light must be focused onto the image sensor. In an embodiment, the optics include a lens that is configured and positioned to focus an image of the illuminated spot onto the image sensor. The focal point of a lens is a function of the lens itself and the distance between the lens and the object to be imaged. The details of the optics design are highly dependent on how and where the image collection system is mounted in relation to the target. It should be understood that many design configurations can be 25 implemented without deviating from the scope of the invention, which is defined by the claims. In some instances, optics may not be necessary.

Figure 19:
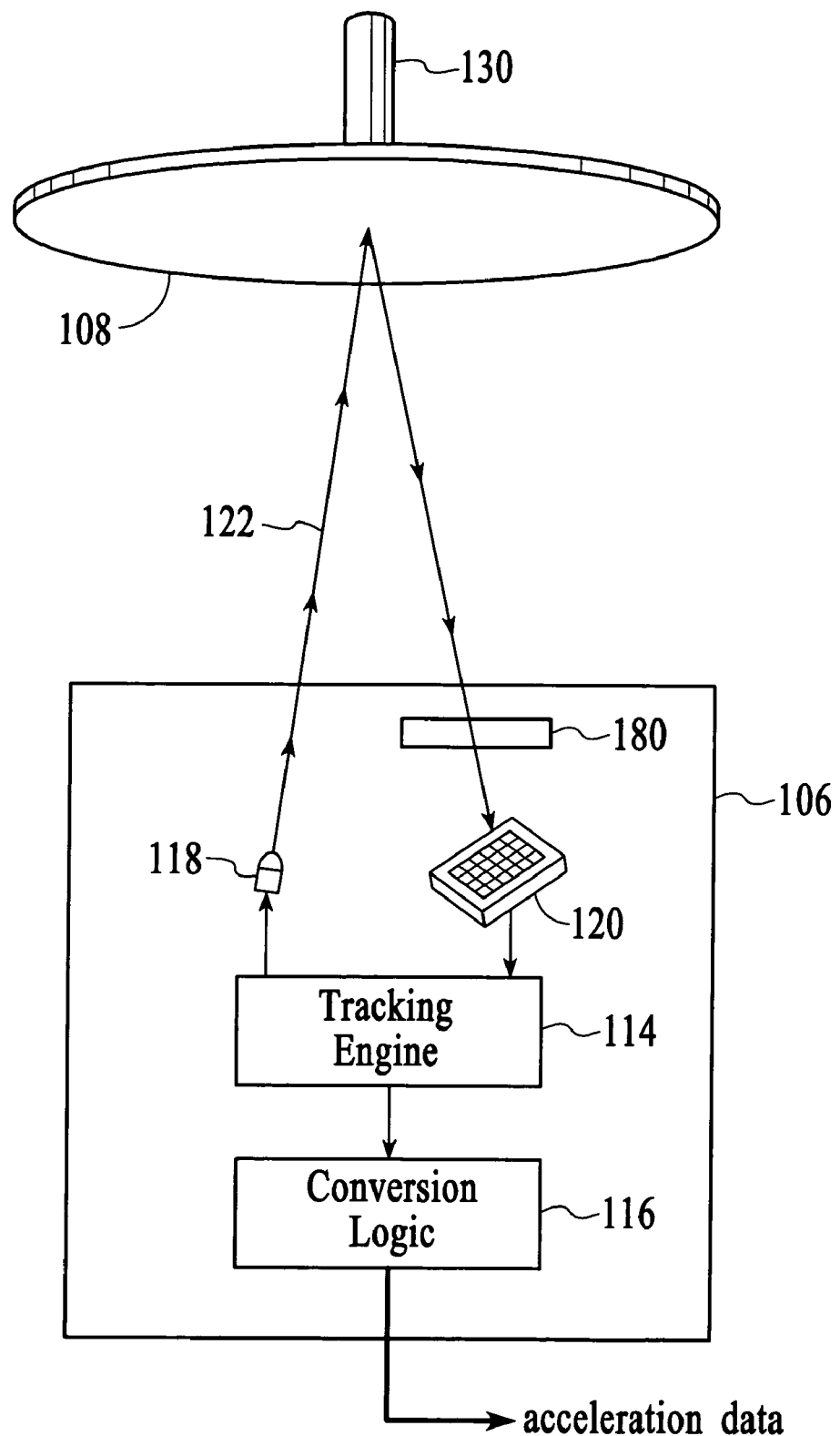
FIG. 19 depicts a sensor module relative to a target, both of which are connected to an object.

FIG. 19 depicts a sensor module 106 relative to a target 108 (shown here without the features 132), both of which are connected to an object (not shown). The sensor module includes optics 180, an LED 118, an image sensor 120, a tracking 30 engine 114, and conversion logic 116. Light 122 generated from the LED illuminates at least a portion of the target. Light that reflects off of the target passes through the optics and is detected by the image sensor. Image information is passed from the image sensor to the tracking engine. The tracking engine determines movement information from the image information and passes the movement information to the conversion logic. The conversion logic uses the movement information to generate acceleration data related to the object.

Figure 20:
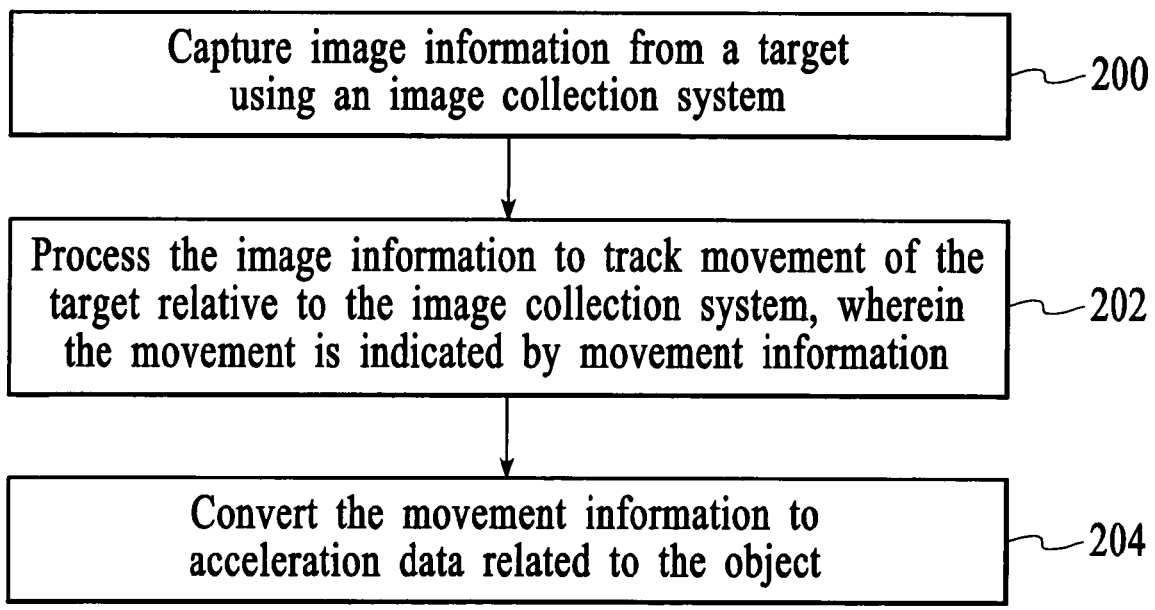
FIG. 20 is a process flow diagram of a method for generating acceleration data in accordance with the invention.

FIG. 20 is a process flow diagram of a method for generating acceleration data in accordance with the invention. At block 200, image information is captured from a target using an image collection system. At block 202, the image information is processed to track movement of the target relative to the image collection system, wherein the movement is indicated by movement information. At block 204, the movement information is converted to acceleration data related to the object.

In an embodiment, the output of the accelerometer vs. acceleration is non-linear. In an embodiment, a non-linear output vs. acceleration profile is established using non-linear springs or by strategic design of the inertial connection. A non-linear output vs. acceleration profile enables the generation of high resolution acceleration data with a wide dynamic range using the same accelerometer.

Although the image collection system 112 is described above as having a single image sensor 120 and a single light source 118, the image collection system can include more than one image sensor and/or more than one light source. Further, the image sensors and light sources can be at the same or different angles relative to the target.

In an embodiment, the light source can be located on the opposite side of the target relative to the image sensor with the target having transparent features that allow light to pass through. Light that passes through the transparent features is detected by the image sensor and used in movement tracking. In an embodiment, the image collection system relies on ambient light as the light source.

Although specific embodiments in accordance with the invention have been described and illustrated, the invention is not to be limited to the specific forms or arrangements of parts so described and illustrated. The scope of the invention is to be defined by the claims appended hereto and their equivalents.

What is claimed is:

1. An accelerometer comprising:
   a target;
   an image collection system configured to capture image information related to the target;
   a tracking engine configured to process the image information to track movement of the target relative to the image collection system in the x, y, and z directions and to output movement information in the x, y, and z directions; and
   conversion logic configured to generate acceleration data, in the x, y, and z directions, which is related to an object in response to the movement information;
   wherein the image collection system further comprises:
   a light source configured to illuminate the target; and
   an image sensor configured to capture image information related to the target in response to light that reflects off the illuminated target, wherein the image sensor comprises an array of distinct photodetectors, wherein each distinct photodetector generates light intensity information and wherein the image sensor captures the image information as image frames and wherein the tracking engine is configured to correlate common features in the image frames to determine the magnitude of movement of the common features.

2. The accelerometer of claim 1 wherein the target and the image collection system are configured such that one of the target and the image collection system moves relative to the other in response to acceleration of an object and wherein the target includes a feature, which when moved relative to the image collection system, produces image information that is distinguishable in at least one direction.

3. The accelerometer of claim 2 further comprising a rigid connection between the object and one of the target and the image collection system, wherein the rigid connection is configured to cause the object and one of the target and the image collection system to move in unison in response to acceleration of the object.

4. The accelerometer of claim 2 further comprising an inertial connection between the object and one of the target and the image collection system, wherein the inertial connection is configured to allow movement between the object and one of the target and the image collection system in response to acceleration of the object.

5. The accelerometer of claim 2 further comprising:
   a rigid connection between the object and one of the target and the image collection system, wherein the rigid connection is configured to cause the object and one of the target and the image collection system to move in unison in response to acceleration of the object; and
   an inertial connection between the object and the other one of the target and the image collection system, wherein the inertial connection is configured to allow movement between the object and the other one of the target and the image collection system in response to acceleration of the object.

6. The accelerometer of claim 1 wherein the image sensor captures the image information as image frames and wherein the tracking engine is configured to correlate common features in the image frames to determine the magnitude and direction of movement of the common features.

7. The accelerometer of claim 1 wherein the image sensor and tracking engine are located on a single integrated circuit device.

8. The accelerometer of claim 1 wherein the target comprises features that are rotationally unique.

9. The accelerometer of claim 8 wherein the movement information includes linear movement information and angular movement information and wherein the acceleration data includes linear acceleration data and angular acceleration data.

10. The accelerometer of claim 1 wherein the tracking engine is configured to compare the sizes of image features in the image information to a pre-established database to determine movement in the z-direction.

11. A method for obtaining acceleration data related to an object, the method comprising:
    capturing image information from a target using an image collection system, wherein capturing the image information comprises capturing image frames with an image sensor;
    within a tracking engine, processing the image information to track movement of the target relative to the image collection system in the x, y, and z directions, wherein the movement is indicated by movement information; and
    within conversion logic, converting the movement information to acceleration data, in the x, y, and z directions, which is related to the object;
    wherein processing the image information to track movement of the target in the x, y, and z directions comprises correlating common features in the image frames to determine the magnitude and direction of movement of the common features in the x, y, and z directions.

12. The method of claim 11 wherein the target and image collection system are configured such that one of the target and the image collection system moves relative to the other in response to acceleration of an object and wherein the target includes a feature, which when moved relative to the image collection system, produces image information that is distinguishable in at least one direction.

13. The method of claim 12 wherein one of the target element and the image collection system moves in unison with the object in response to acceleration of the object.

14. The method of claim 12 wherein one of the target element and the image collection system moves relative to the object in response to acceleration of the object.

15. The method of claim 12 wherein one of the target element and the image collection system moves in unison with the object in response to acceleration of the object and wherein the other one of the target element and the image collection system moves relative to the object in response to acceleration of the object.

16. The method of claim 12 wherein capturing the image information comprises illuminating the target and detecting light that reflects off of the illuminated target.

17. The method of claim 12 wherein the target comprises features that are rotationally unique.

18. The method of claim 17 wherein the movement information includes linear movement information and angular movement information and wherein the acceleration data includes linear acceleration data and angular acceleration data.

19. The method of claim 11 wherein processing the image information comprises comparing the sizes of image features in the image information to a pre-established database to determine movement in the z-direction.

20. An accelerometer comprising:
a target;
an image collection system configured to capture image information related to the target;
wherein one of the target element and the image collection system is connected to an object by a rigid connection and wherein the other one of the target element and image collection system is connected to the object by an inertial connection and wherein the target includes a feature, which when moved relative to the image collection system, produces image information that is distinguishable in the x, y, and z directions;
a tracking engine configured to correlate common features in the image information to track movement of the target relative to the image collection system and to output movement information in the x, y, and z directions; and
conversion logic configured to generate acceleration data, in the x, y, and z directions, which is related to the object in response to the movement information.

21. The accelerometer of claim 20 wherein the rigid connection is configured to cause the object and one of the target element or the image collection system to move in unison in response to acceleration of the object.

22. The accelerometer of claim 20 wherein the inertial connection is configured to allow movement between the object and one of the target element or the image collection system in response to acceleration of the object.

23. The accelerometer of claim 20 wherein the rigid connection is configured to cause the object and one of the target element or the image collection system to move in unison in response to acceleration of the object and wherein the inertial connection is configured to allow movement between the object and the other of the target element and the image collection system in response to acceleration of the object.

24. The accelerometer of claim 20 wherein the tracking engine is configured to compare the sizes of image features in the image information to a pre-established database to determine movement in the z-direction.

* * * * *